(12) United States Patent
Ozturk et al.

(10) Patent No.: US 12,133,266 B2
(45) Date of Patent: Oct. 29, 2024

(54) LISTEN-BEFORE-TALK FAILURE REPORTING FOR SIDELINK CHANNELS

(71) Applicant: QUALCOMM Incorporated, San Diego, CA (US)

(72) Inventors: Ozcan Ozturk, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/160,138

(22) Filed: Jan. 26, 2023

(65) Prior Publication Data

US 2023/0232460 A1  Jul. 20, 2023

Related U.S. Application Data

(63) Continuation of application No. 17/127,063, filed on Dec. 18, 2020, now Pat. No. 11,570,820.

(51) Int. Cl.
*H04W 72/25* (2023.01)
*H04L 1/08* (2006.01)
*H04L 41/0677* (2022.01)
*H04W 74/0808* (2024.01)
*H04W 74/0833* (2024.01)
*H04W 92/18* (2009.01)

(52) U.S. Cl.
CPC ........... *H04W 74/0833* (2013.01); *H04L 1/08* (2013.01); *H04L 41/0677* (2013.01); *H04W 72/25* (2023.01); *H04W 74/0808* (2013.01); *H04W 92/18* (2013.01)

(58) Field of Classification Search
None
See application file for complete search history.

(56) References Cited

U.S. PATENT DOCUMENTS

| | | | |
|---|---|---|---|
| 11,570,820 B2* | 1/2023 | Ozturk | H04L 1/08 |
| 2015/0049712 A1* | 2/2015 | Chen | H04W 74/0833 370/329 |
| 2016/0247400 A1* | 8/2016 | Nguyen | H04L 67/125 |
| 2016/0323915 A1* | 11/2016 | Liu | H04W 74/0825 |
| 2017/0156175 A1* | 6/2017 | Kim | H04W 72/20 |
| 2017/0188391 A1* | 6/2017 | Rajagopal | H04W 74/0816 |
| 2017/0250847 A1* | 8/2017 | Li | H04L 27/2603 |
| 2017/0325201 A1* | 11/2017 | Chen | H04W 74/0833 |

(Continued)

FOREIGN PATENT DOCUMENTS

WO   WO-2020201490 A1   10/2020

OTHER PUBLICATIONS

International Search Report and Written Opinion—PCT/US2021/072773—ISA/EPO—Mar. 25, 2022.

*Primary Examiner* — Faiyazkhan Ghafoerkhan
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may detect, while transmitting data using at least one first bandwidth on at least one sidelink channel to at least one other UE, one or more failures of a listen-before-talk (LBT) procedure within an amount of time. The UE may transmit, to at least one of a base station or the at least one other UE, a report indicating the one or more failures. Numerous other aspects are described.

20 Claims, 9 Drawing Sheets

(56) References Cited

U.S. PATENT DOCUMENTS

| | | | |
|---|---|---|---|
| 2018/0077518 A1* | 3/2018 | Nguyen | H04W 4/06 |
| 2018/0114382 A1* | 4/2018 | Courter | G01R 31/008 |
| 2018/0124612 A1* | 5/2018 | Babaei | H04W 72/23 |
| 2018/0124749 A1* | 5/2018 | Park | H04W 72/23 |
| 2018/0146494 A1* | 5/2018 | Khoryaev | H04W 76/15 |
| 2018/0184475 A1* | 6/2018 | Babaei | H04W 16/14 |
| 2018/0359715 A1* | 12/2018 | Abedini | H04L 5/0048 |
| 2019/0035177 A1* | 1/2019 | Courter | G01R 31/66 |
| 2019/0069325 A1* | 2/2019 | Yerramalli | H04L 5/00 |
| 2019/0289657 A1* | 9/2019 | Babaei | H04L 27/0006 |
| 2020/0037343 A1* | 1/2020 | He | H04W 28/0268 |
| 2020/0059962 A1* | 2/2020 | Tejedor | H04W 76/14 |
| 2020/0084792 A1* | 3/2020 | Khoryaev | H04W 74/04 |
| 2020/0100284 A1* | 3/2020 | Li | H04L 1/1854 |
| 2020/0221495 A1* | 7/2020 | Chen | H04W 36/0069 |
| 2020/0229261 A1* | 7/2020 | Jung | H04W 76/20 |
| 2020/0229262 A1* | 7/2020 | Jung | H04W 76/11 |
| 2020/0252821 A1* | 8/2020 | Deogun | H04W 76/19 |
| 2020/0267763 A1* | 8/2020 | Deogun | H04W 74/085 |
| 2020/0313804 A1* | 10/2020 | Ryu | H04W 72/20 |
| 2020/0351669 A1* | 11/2020 | Xu | H04W 72/56 |
| 2021/0007081 A1* | 1/2021 | Shin | H04L 1/1896 |
| 2021/0022056 A1* | 1/2021 | Lee | H04W 76/27 |
| 2021/0022116 A1* | 1/2021 | Lee | H04L 5/0053 |
| 2021/0058976 A1* | 2/2021 | Deogun | H04W 74/085 |
| 2021/0075556 A1* | 3/2021 | Karaki | H04L 1/1887 |
| 2021/0099967 A1* | 4/2021 | Lee | H04B 7/2643 |
| 2021/0136818 A1* | 5/2021 | Deogun | H04W 72/0446 |
| 2021/0153110 A1* | 5/2021 | Garcia Martin | H04W 48/18 |
| 2021/0234751 A1* | 7/2021 | Yerramalli | H04W 74/0833 |
| 2021/0306125 A1* | 9/2021 | Khoshnevisan | H04L 5/0044 |
| 2021/0307070 A1* | 9/2021 | Kim | H04W 74/0816 |
| 2022/0022252 A1* | 1/2022 | Lee | H04W 76/18 |
| 2022/0046510 A1* | 2/2022 | Kung | H04W 36/00837 |
| 2022/0070918 A1* | 3/2022 | Fan | H04W 74/0808 |
| 2022/0070922 A1* | 3/2022 | Talarico | H04W 74/0808 |
| 2022/0078670 A1* | 3/2022 | Kung | H04W 36/04 |
| 2022/0201760 A1* | 6/2022 | Ozturk | H04W 74/0808 |
| 2023/0232460 A1* | 7/2023 | Ozturk | H04W 74/0833 370/242 |

\* cited by examiner

LISTEN-BEFORE-TALK FAILURE REPORTING FOR SIDELINK CHANNELS

CROSS REFERENCE TO RELATED APPLICATIONS

This application is a continuation of U.S. application Ser. No. 17/127,063, filed on Dec. 18, 2020, and entitled "LISTEN-BEFORE-TALK FAILURE REPORTING FOR SIDELINK CHANNELS", the disclosure of which is incorporated herein by reference.

FIELD OF THE DISCLOSURE

Aspects of the present disclosure generally relate to wireless communication and to techniques and apparatuses for listen-before-talk failure reporting for sidelink channels.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors operatively coupled to the memory, the memory and the one or more processors configured to detect, while transmitting data using at least one first bandwidth on at least one sidelink channel to at least one other UE, one or more failures of a listen-before-talk (LBT) procedure within an amount of time; and transmit, to at least one of a base station or the at least one other UE, a report indicating the one or more failures.

In some aspects, a base station for wireless communication includes a memory and one or more processors operatively coupled to the memory, the memory and the one or more processors configured to receive, from a UE, a report indicating one or more failures of an LBT procedure associated with at least one first bandwidth on at least one sidelink channel; and transmit, to the UE, an indication of at least one second bandwidth to use on the at least one sidelink channel.

In some aspects, a method of wireless communication performed by a UE includes detecting, while transmitting data using at least one first bandwidth on at least one sidelink channel to at least one other UE, one or more failures of an LBT procedure within an amount of time; and transmitting, to at least one of a base station or the at least one other UE, a report indicating the one or more failures.

In some aspects, a method of wireless communication performed by a base station includes receiving, from a UE, a report indicating one or more failures of an LBT procedure associated with at least one first bandwidth on at least one sidelink channel; and transmitting, to the UE, an indication of at least one second bandwidth to use on the at least one sidelink channel.

In some aspects, a non-transitory computer-readable medium storing a set of instructions for wireless communication includes one or more instructions that, when executed by one or more processors of a UE, cause the UE to detect, while transmitting data using at least one first bandwidth on at least one sidelink channel to at least one other UE, one or more failures of an LBT procedure within an amount of time; and transmit, to at least one of a base station or the at least one other UE, a report indicating the one or more failures.

In some aspects, a non-transitory computer-readable medium storing a set of instructions for wireless communication includes one or more instructions that, when executed by one or more processors of a base station, cause the base station to receive, from a UE, a report indicating one or more failures of an LBT procedure associated with at least one first bandwidth on at least one sidelink channel; and transmit, to the UE, an indication of at least one second bandwidth to use on the at least one sidelink channel.

In some aspects, an apparatus for wireless communication includes means for detecting, while transmitting data using at least one first bandwidth on at least one sidelink channel to at least one other UE, one or more failures of an LBT procedure within an amount of time; and means for transmitting, to at least one of a base station or the at least one other UE, a report indicating the one or more failures.

In some aspects, an apparatus for wireless communication includes means for receiving, from a UE, a report indicating one or more failures of an LBT procedure associated with at least one first bandwidth on at least one sidelink channel; and means for transmitting, to the UE, an indication of at least one second bandwidth to use on the at least one sidelink channel.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
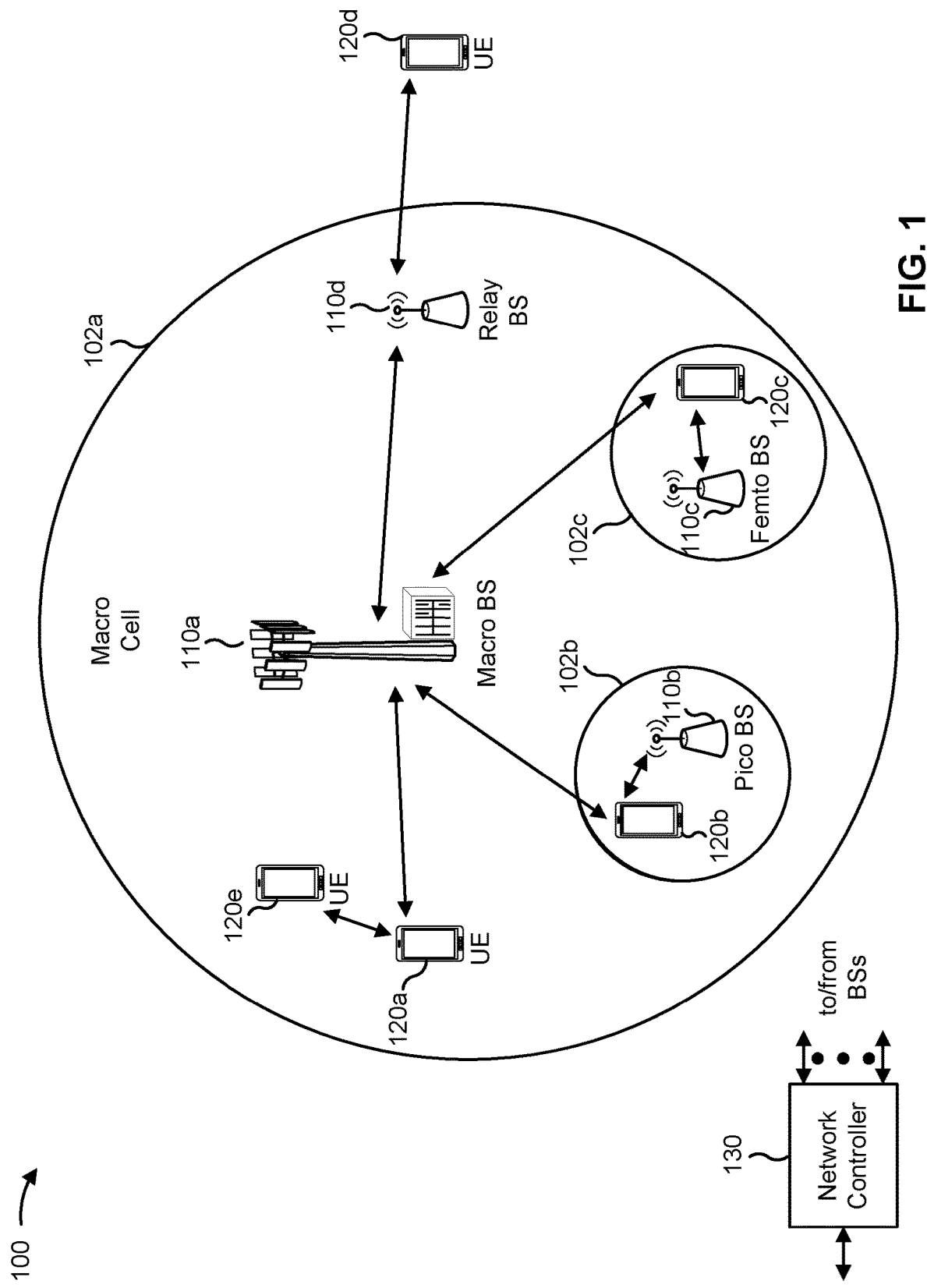
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
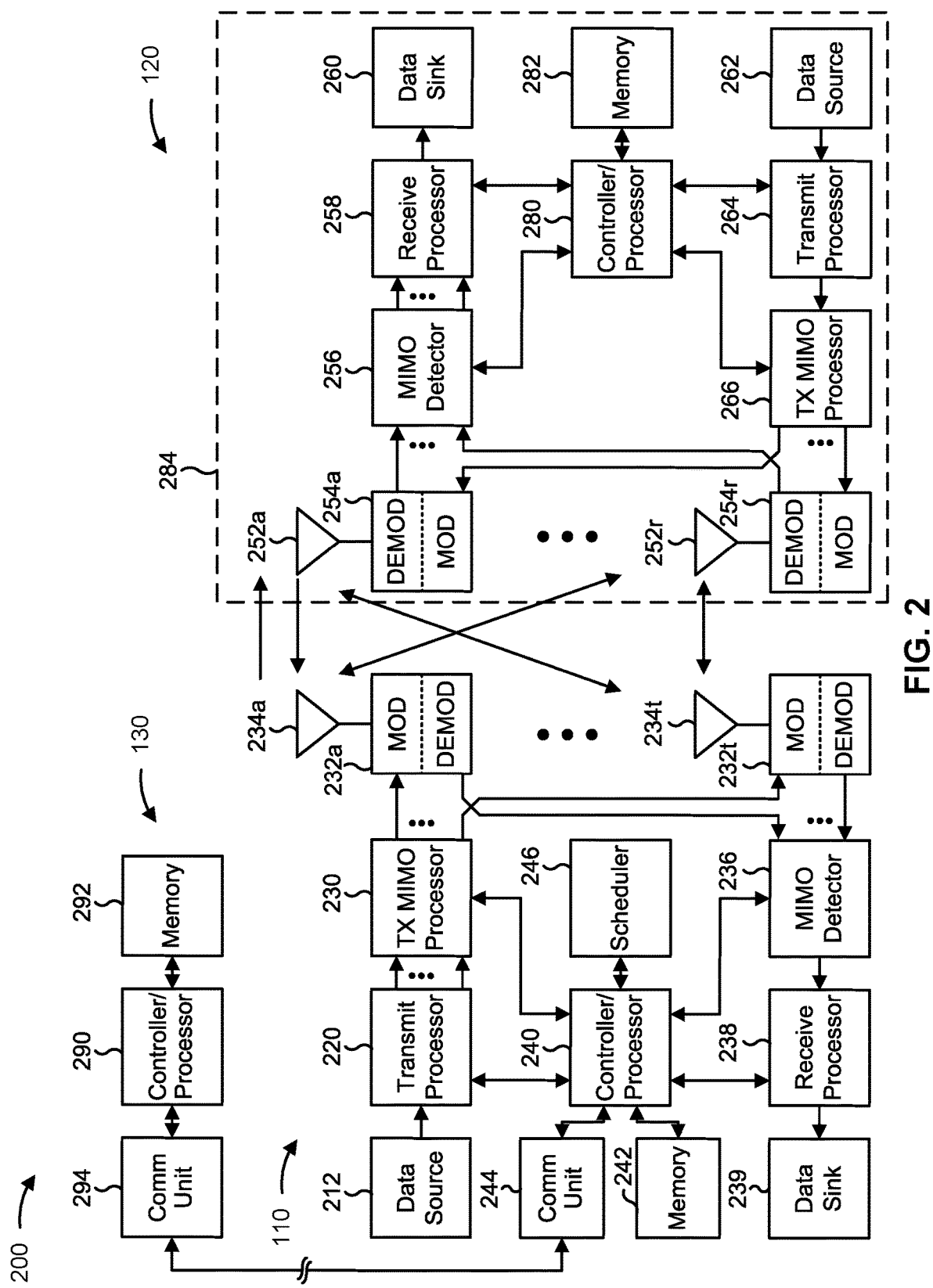
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-7.

Controller/processor 240 of base station 110, controller/processor 280 of UE 120, and/or any other component(s) of FIG. 2 may perform one or more techniques associated with LBT failure reporting for sidelink channels, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, a UE (e.g., apparatus 800 of FIG. 8, Tx UE 305-1 of FIG. 5, and/or UE 120) may include means for detecting, while transmitting data using at least one first bandwidth on at least one sidelink channel to at least one other UE, one or more failures of an LBT procedure within an amount of time; and/or means for transmitting, to at least one of a base station or the at least one other UE, a report indicating the one or more failures. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE may further include means for receiving at least one configuration message from the base station, wherein the amount of time is based at least in part on the at least one configuration message. In some aspects, the UE may further include means for retransmitting the data, to the at least one other UE, using at least one second bandwidth on the at least one sidelink channel. Additionally, or alternatively, the UE may further include means for canceling pending transmissions based at least in part on detecting the one or more failures; and/or means for ceasing transmitting one or more broadcast signals based at least in part on detecting the one or more failures.

In some aspects, a base station (e.g., apparatus 900 of FIG. 9 and/or base station 110) may include means for receiving, from a UE (e.g., apparatus 800 of FIG. 8, Tx UE 305-1 of FIG. 5, and/or UE 120), a report indicating one or more failures of an LBT procedure associated with at least one first bandwidth on at least one sidelink channel; and/or means for transmitting, to the UE, an indication of at least one second bandwidth to use on the at least one sidelink channel. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station may further include means for transmitting at least one configuration message to the UE, wherein the one or more failures are associated with an amount of time that is based at least in part on the at least one configuration message.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
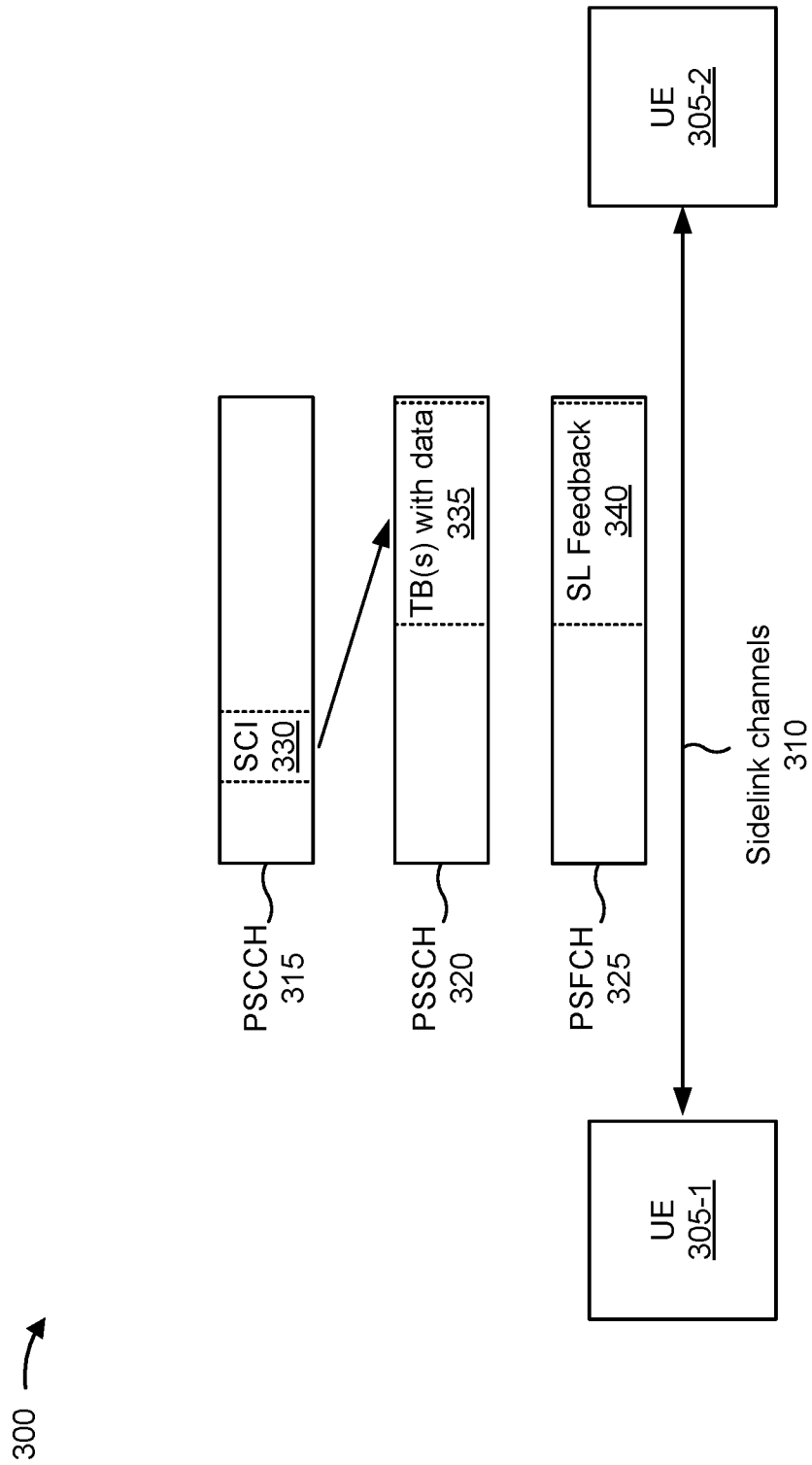
FIG. 3 is a diagram illustrating an example of sidelink communications, in accordance with various aspects of the present disclosure.

FIG. 3 is a diagram illustrating an example 300 of sidelink communications, in accordance with various aspects of the present disclosure. As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
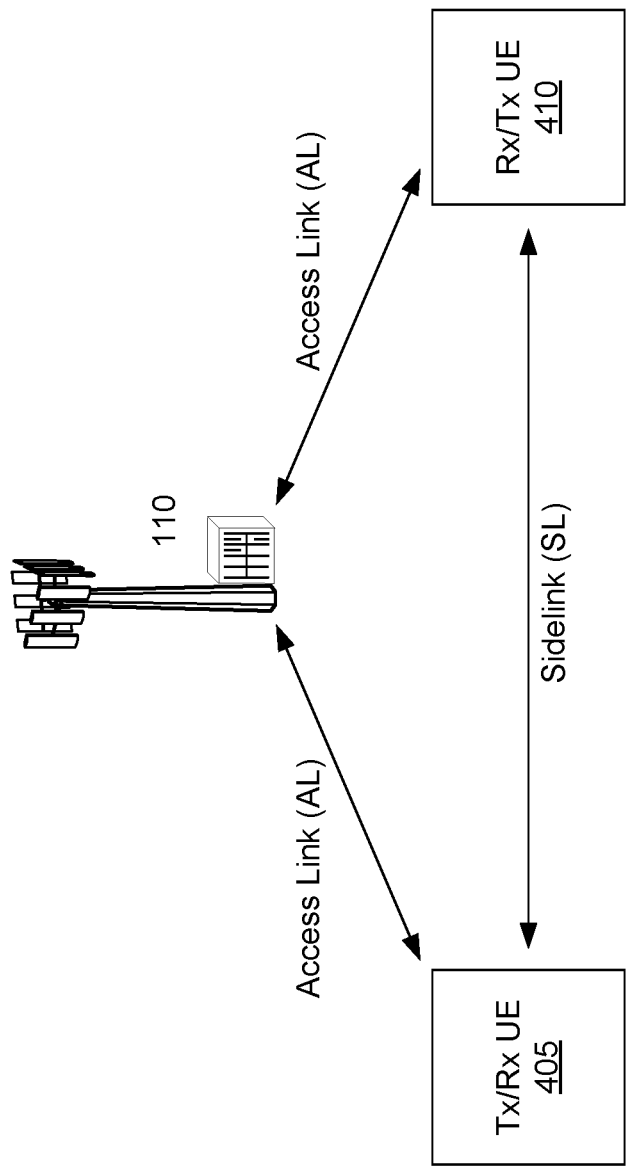
FIG. 4 is a diagram illustrating an example of sidelink communications and access link communications, in accordance with various aspects of the present disclosure.

FIG. 4 is a diagram illustrating an example 400 of sidelink communications and access link communications, in accordance with various aspects of the present disclosure. As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Sidelink channels may be scheduled by a base station (e.g., according to mode 1 PC5 as defined in 3GPP specifications and/or another standard). Accordingly, a base station may transmit one or more configuration messages to a transmitting (Tx) UE that indicate one or more resources (e.g., bandwidths, frequencies, slots or other time periods, and/or spatial filters such as beams) to use when the Tx UE transmits to a receiving (Rx) UE on a sidelink channel. As an alternative, sidelink channels may be scheduled by the Tx UE without base station involvement (e.g., according to mode 2 PC5 as defined in 3GPP specifications and/or another standard). Accordingly, the Tx UE may transmit first SCI (SCI1) to reserve one or more resources for the sidelink channel and then transmit second SCI (SCI2) to schedule transmissions to the Rx UE on that sidelink channel. The Tx UE may transmit to a single Rx UE (e.g., using a unicast link on the sidelink channel), to a plurality of Rx UEs (e.g., using a groupcast link, also referred to as a multicast link, on the sidelink channel), and/or to any Rx UEs within a geographic area (e.g., by broadcasting on the sidelink channel).

In both mode 1 and mode 2, a Tx UE may use an LBT procedure on at least one sidelink channel. For example, the Tx UE may wait for one or more symbols of a slot (e.g., a portion of a radio frame), and transmit (e.g., to an Rx UE) within that slot only when the Tx UE does not decode a transmission in those one or more symbols. The Tx UE may wait for a preconfigured amount of time or for a dynamic amount of time (e.g., determined based on a minimum amount of time, a maximum amount of time, an energy level associated with the transmission, a power class of the Tx UE, an antenna gain associated with the Rx UE, and/or another variable). Accordingly, the LBT procedure may include a carrier sensing multiple access (CSMA) procedure, a clear channel assessment (CCA) procedure, a carrier sensing adaptive transmission (CSAT) procedure, and/or another similar procedure. For example, the Tx UE may use an LBT procedure as set forth in the Institute of Electrical and Electronics Engineers (IEEE) LAN/MAN Standards Committee 802.11 standards, the IEEE Wireless Coexistence Technical Advisory Group (TAG) 802.19 standards, the European Telecommunications Standards Institute (ETSI) Harmonised European Standard (EN) 300 328, and/or another standard. The Tx UE may use the LBT procedure at least in part because the at least one sidelink channel is over an unlicensed band channel. For example, the at least one sidelink channel may use NR unlicensed (NR-U) spectrum.

The Tx UE may detect one or more LBT failures on a sidelink channel. For example, the Tx UE may detect failure of a CSMA procedure, a CCA procedure, a CSAT procedure, and/or another LBT procedure. However, the Tx UE generally continues to attempt (using an LBT procedure) to transmit on the sidelink channel. Accordingly, continued LBT procedure failures may result in reduced quality and/or reliability of sidelink communications as well as increased latency and wasted processing resources.

Some techniques and apparatuses described herein enable a Tx UE (e.g., UE 305-1 and/or UE 120) to report one or more LBT failures on a sidelink channel to a base station (e.g., base station 110) and/or at least one Rx UE (e.g., UE 305-2 and/or UE 120). As a result, in mode 1, the Tx UE 305-1 may obtain one or more new resources from the base station 110 to use on the sidelink channel in order to increase quality and/or reliability of sidelink communications as well as conserve processing resources. In mode 2, the Tx UE 305-1 may report the one or more LBT failures to the Rx UE 305-2 such that the Rx UE 305-2 may conserve processing resources. Additionally, in some aspects, the Tx UE 305-1 may configure a new sidelink channel with the Rx UE 305-2, based at least in part on the one or more LBT failures, in order to increase quality and/or reliability of sidelink communications.

Figure 5:
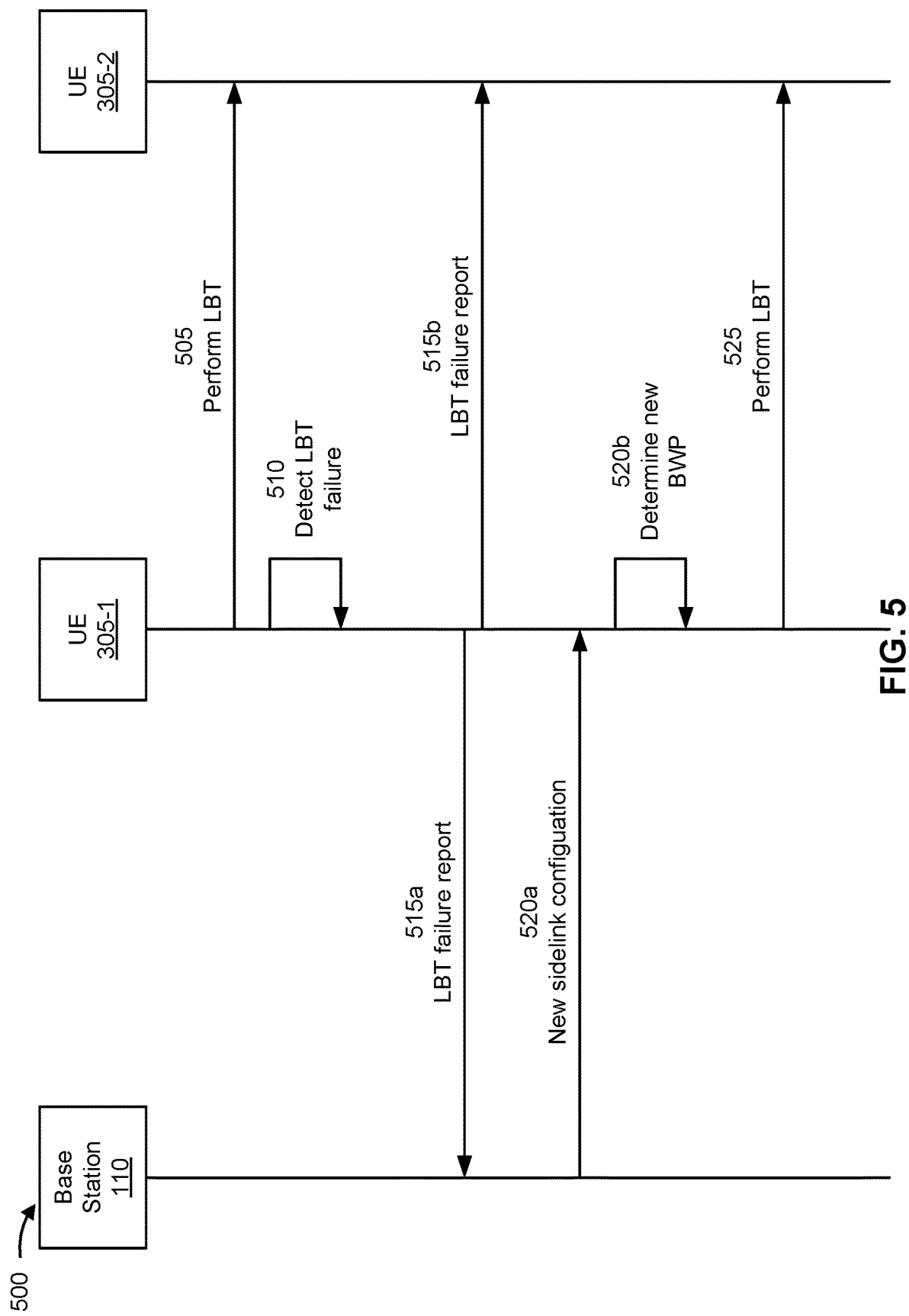
FIG. 5 is a diagram illustrating an example associated with listen-before-talk (LBT) failure reporting for sidelink channels, in accordance with various aspects of the present disclosure.

FIG. 5 is a diagram illustrating an example 500 associated with LBT failure reporting for sidelink channels, in accordance with various aspects of the present disclosure. As shown in FIG. 5, example 500 includes communication between a Tx UE 305-1 and an Rx UE 305-2. In some aspects, the Tx UE 305-1 and the Rx UE 305-2 may communicate on at least one sidelink channel (e.g., as described above in connection with FIGS. 3 and 4). In some aspects, the at least one sidelink channel may include a physical sidelink broadcast channel (PSBCH), a PSCCH, a PSSCH, a PSFCH, and/or another sidelink channel. In some aspects, the Tx UE 305-1 may schedule sidelink communications to the Rx UE 305-2 without base station involvement (e.g., according to mode 2 PC5 as defined in 3GPP specifications and/or another standard). As an alternative, example 500 may further include communications between a base station 110 and the Tx UE 305-1. For example, the base station 110 may transmit one or more configuration messages to the Tx UE 305-1 that indicate one or more resources (e.g., bandwidths, frequencies, slots or other time periods, and/or spatial filters such as beams) to use when transmitting data to the Rx UE 305-2 on the sidelink channel. In some aspects, the base station 110 and the Tx UE 305-1 may be included in a wireless network, such as wireless network 100.

As shown in connection with reference number 505, the Tx UE 305-1 may perform at least one LBT procedure. For example, as shown in FIG. 5, the Tx UE 305-1 may perform at least one LBT procedure when attempting to transmit data using at least one first bandwidth on at least one sidelink channel to the Rx UE 305-2. As described above, the at least one LBT procedure may include a CSMA procedure, a CCA procedure, a CSAT procedure, and/or another LBT procedure.

As shown in connection with reference number 510, the Tx UE 305-1 may detect, while transmitting the data, one or more failures of an LBT procedure within an amount of time. For example, the Tx UE 305-1 may use a counter that detects a threshold quantity of failures (e.g., the threshold may include an lbt-FailureInstanceMaxCount threshold as defined in 3GPP specifications and/or another standard) before expiry of a timer (e.g., the timer may include an lbt-FailureDetectionTimer timer as defined in 3GPP specifications and/or another standard). Accordingly, whenever the Tx UE 305-1 detects a failure of an LBT procedure, the Tx UE 305-1 may increment the counter, such that the Tx UE 305-1 triggers one or more steps as described in connection with reference numbers 515a, 515b, 520a, 520b, and/or 525 when the counter satisfies the threshold. The Tx UE 305-1 may reset the counter when the timer expires (e.g., no further failures of an LBT procedure are detected within the amount of time).

In some aspects, the base station 110 may transmit, and the Tx UE 305-1 may receive, at least one configuration message, and the amount of time and/or the threshold may be based at least in part on the at least one configuration message. For example, the base station 110 may indicate the amount of time and/or the threshold for the Tx UE 305-1 to use. Additionally, or alternatively, the amount of time and/or the threshold may be based at least in part on one or more values stored in a memory of the Tx UE 305-1. For example, the Tx UE 305-1 may be programmed (and/or otherwise preconfigured) to use one or more values defined in 3GPP specifications and/or another standard. In another example, the Tx UE 305-1 may select one or more values of a plurality of values defined in 3GPP specifications and/or another standard. The Tx UE 305-1 may select the one or more values using a look-up table and/or another formula that accepts, as input, one or more indicators of quality for the at least one sidelink channel, one or more indicators of target throughput for the at least one sidelink channel, one or more transmission variables (e.g., transmit power, transmit distance), and/or another variable, and outputs the amount of time and/or the threshold to use. In another example, the base station 110 may indicate (e.g., in the at least one configuration message) one or more values of a plurality of values defined in 3GPP specifications and/or another standard for the Tx UE 305-1 to use.

Additionally, or alternatively, the Rx UE 305-2 may transmit, and the Tx UE 305-1 may receive, at least one configuration message, and the amount of time and/or the threshold may be based at least in part on the at least one configuration message. For example, the Rx UE 305-2 may indicate the amount of time and/or the threshold for the Tx UE 305-1 to use. In another example, the Rx UE 305-2 may indicate (e.g., in the at least one configuration message) one or more values of a plurality of values defined in 3GPP specifications and/or another standard for the Tx UE 305-1 to use. In another example, the Tx UE 305-1 may determine to ignore the at least one configuration message and select one or more values to use for the amount of time and/or the threshold (e.g., using a formula or another technique as described above).

In some aspects, one LBT procedure (e.g., performed as described above in connection with reference number 505) may fail such that the Tx UE 305-1 attempts to perform one or more retransmissions. Accordingly, the at least one LBT procedure may include a plurality of LBT procedures associated with a transmission and at least one retransmission.

In some aspects, the one or more failures may be associated with at least one unicast link to at least the Rx UE 305-2, a groupcast link to at least the Rx UE 305-2, and/or another link to at least the Rx UE 305-2. The Tx UE 305-1 may aggregate LBT failures across unicast links to one or more UEs and/or across groupcast links to a plurality of UEs. As an alternative, the Tx UE 305-1 may detect LBT failures separately on different unicast links and/or separately on different groupcast links. Although the description below will focus on sidelink communications with the Rx UE 305-2, the Tx UE 305-1 may aggregate LBT failures that occur during transmissions to the Rx UE 305-2 with those that occur during transmissions to other UEs. As an alternative, the Tx UE 305-1 may separately detect LBT failures that occur during transmissions to different UEs.

Additionally, or alternatively, the one or more failures may be aggregated across one or more PSBCHs, one or more PSCCHs, one or more PSSCHs, one or more PSFCHs, and/or one or more other sidelink channels. For example, such channels may share a link to one or more of the same UEs, an RB set, a bandwidth part (BWP), and/or one or more other resources such that the Tx UE 305-1 aggregates LBT failures for those channels. In some aspects, when the Tx UE 305-1 operates in mode 2, the Tx UE 305-1 may aggregate LBT failures associated with transmissions of SCI1 with LBT failures associated with transmission of SCI2. As an alternative, the Tx UE 305-1 may detect LBT failures associated with transmissions of SCI1 separately from detecting LBT failures associated with transmission of SCI2.

Additionally, or alternatively, the one or more failures may be aggregated across an RB set, a BWP, and/or a plurality of sidelink channels. For example, the Tx UE 305-1 may aggregate LBT failures that occur on one RB set with those that occur on one or more other RB sets. Additionally, or alternatively, the Tx UE 305-1 may aggregate LBT failures that occur on one BWP with those that occur on one or more other BWPs. Additionally, or alternatively, the Tx UE 305-1 may aggregate LBT failures that occur on one sidelink channel with those that occur on one or more other sidelink channels. In some aspects, Tx UE 305-1 may further aggregate LBT failures across unicast links and/or groupcast links, as described above.

Additionally, or alternatively, the one or more failures may be aggregated across a PC5 interface for the at least one sidelink channel and a Uu interface with the base station 110. For example, the Uu interface may share one or more carriers and/or RB sets with the PC5 interface such that the Tx UE 305-1 aggregates LBT failures for those one or more carriers and/or RB sets across the PC5 interface and the Uu interface.

Additionally, or alternatively, the one or more failures may be associated with one carrier of a plurality of aggregated carriers. For example, the Tx UE 305-1 may use one or more carriers associated with a primary cell (PCell) aggregated with one or more carriers associated with one or more secondary cells (SCells). Accordingly, the Tx UE 305-1 may aggregate LBT failures across the carriers or may detect LBT failures separately. For example, the Tx UE 305-1 may detect LBT failures separately for each carrier or separately for each set of carriers associated with a different SCell.

In some aspects, the amount of time and/or the threshold may be based at least in part on whether the one or more failures are associated with at least one unicast link, a groupcast link, and/or a broadcast transmission; whether the one or more failures are associated with a PSBCH, a PSCCH, a PSSCH, a PSFCH, and/or another sidelink channel; which RB set and/or BWP is associated with the one or more failures; whether the one or more failures are associated with a PC5 interface and/or a Uu interface; and/or which carrier and/or SCell is associated with the one or more failures. For example, the base station 110 may transmit and/or the Tx UE 305-1 may select different values for the amount of time and/or the threshold based at least in part on one or more of the factors described above.

In some aspects, the Tx UE 305-1 may further cancel pending transmissions based at least in part on detecting the one or more failures and/or cease transmitting one or more broadcast signals (e.g., a PSBCH transmission, a sidelink synchronization signal block (S-SSB), and/or another broadcast signal) based at least in part on detecting the one or more failures.

As shown in connection with reference number 515*a,* the Tx UE 305-1 may transmit, and the base station 110 may receive, a report indicating the one or more failures. For example, the Tx UE 305-1 may transmit, and the base station 110 may receive, a medium access control (MAC) layer control element (MAC-CE) including the report. In some aspects, the at least one sidelink channel may include a base station controlled sidelink channel such that the Tx UE 305-1 transmits the report to the base station 110.

In some aspects, the one or more failures may be associated with one or more carriers that are associated with one or more SCells. Accordingly, the Tx UE 305-1 may transmit a SidelinkUEInformationNR message, as defined in 3GPP specifications and/or another standard, that includes a cause value set to "LBT failure" and one or more identifiers (e.g., cell IDs) associated with the one or more SCells. As an alternative, the one or more failures may be associated with one or more carriers that are associated with a PCell. Accordingly, the Tx UE 305-1 may declare radio link failure (RLF) on the at least one sidelink channel and transmit a SidelinkUEInformationNR message, as defined in 3GPP specifications and/or another standard, that includes a cause value set to "LBT failure."

In some aspects, the Tx UE 305-1 may select a Uu cell including the base station 110 to receive the report based at least in part on a correspondence between a PC5 interface associated with the at least one sidelink channel and a Uu interface associated with the Uu cell. For example, the Uu interface may share one or more carriers and/or RB sets with the PC5 interface such that there is a correspondence between the PC5 interface and the Uu interface.

In some aspects, the report may further indicate whether the one or more failures are associated with at least one unicast link, a groupcast link, and/or a broadcast transmission; whether the one or more failures are associated with a PSBCH, a PSCCH, a PSSCH, a PSFCH, and/or another sidelink channel; which RB set and/or BWP is associated with the one or more failures; and/or whether the one or more failures are associated with a PC5 interface and/or a Uu interface.

Additionally, or alternatively, and as shown in connection with reference number 515*b,* the Tx UE 305-1 may transmit, and the Rx UE 305-2 may receive, a report indicating the one or more failures. For example, the Tx UE 305-1 may transmit, and the Rx UE 305-2 may receive, the report on a different sidelink channel.

In some aspects, the Tx UE 305-1 may be unable to transmit the report directly to the Rx UE 305-2 (e.g., because no other sidelink channels are established or other sidelink channels also encounter LBT failures). Accordingly, in some aspects, the Tx UE 305-1 may transmit the report to a relay UE on a sidelink channel between the Tx UE 305-1 and the relay UE, and the relay UE may forward the report to the Rx UE 305-2 on a sidelink channel between the relay UE and the Rx UE 305-2.

In some aspects, and as shown in connection with reference number 520*a,* the base station 110 may transmit, and the Tx UE 305-1 may receive, an indication of at least one second bandwidth to use on the at least one sidelink channel. For example, the base station 110 may determine the at least one second bandwidth based at least in part on receiving the report (e.g., as described above in connection with reference number 515*a*) and may transmit an updated configuration for the at least one sidelink channel that indicates the at least one second bandwidth.

As an alternative, and as shown in connection with reference number 520*b,* the Tx UE 305-1 may determine at least one second bandwidth to use on the at least one sidelink channel. For example, the Tx UE 305-1 may determine the at least one second bandwidth based at least in part on detecting the one or more failures and may transmit new SCI (e.g., SCI1) to reserve the at least one second bandwidth for transmitting to the Rx UE 305-2.

As shown in connection with reference number 525, the Tx UE 305-1 may again perform at least one LBT procedure. For example, as shown in FIG. 5, the Tx UE 305-1 may perform at least one LBT procedure when attempting to retransmit the data using the at least one second bandwidth on the at least one sidelink channel to the Rx UE 305-2. Accordingly, when the LBT procedure succeeds, the Tx UE 305-1 may retransmit the data, to the Rx UE 305-2, using the at least one second bandwidth on the at least one sidelink channel.

By using techniques described in connection with FIG. 5, the Tx UE 305-1 may report one or more LBT failures on a sidelink channel to the base station 110 and/or the Rx UE 305-2. As a result, in mode 1, the Tx UE 305-1 may obtain one or more new resources from the base station 110 to use on the sidelink channel in order to increase quality and/or reliability of sidelink communications with the Rx UE 305-2 as well as conserve processing resources. In mode 2, the Tx UE 305-1 may report the one or more LBT failures to the Rx UE 305-2 such that the Rx UE 305-2 may conserve processing resources. Additionally, in some aspects, the Tx UE 305-1 may configure a new sidelink channel with the Rx UE 305-2, based at least in part on the one or more LBT failures, in order to increase quality and/or reliability of sidelink communications with the Rx UE 305-2.

As indicated above, FIG. 5 is provided as an example. Other examples may differ from what is described with respect to FIG. 5.

Figure 6:
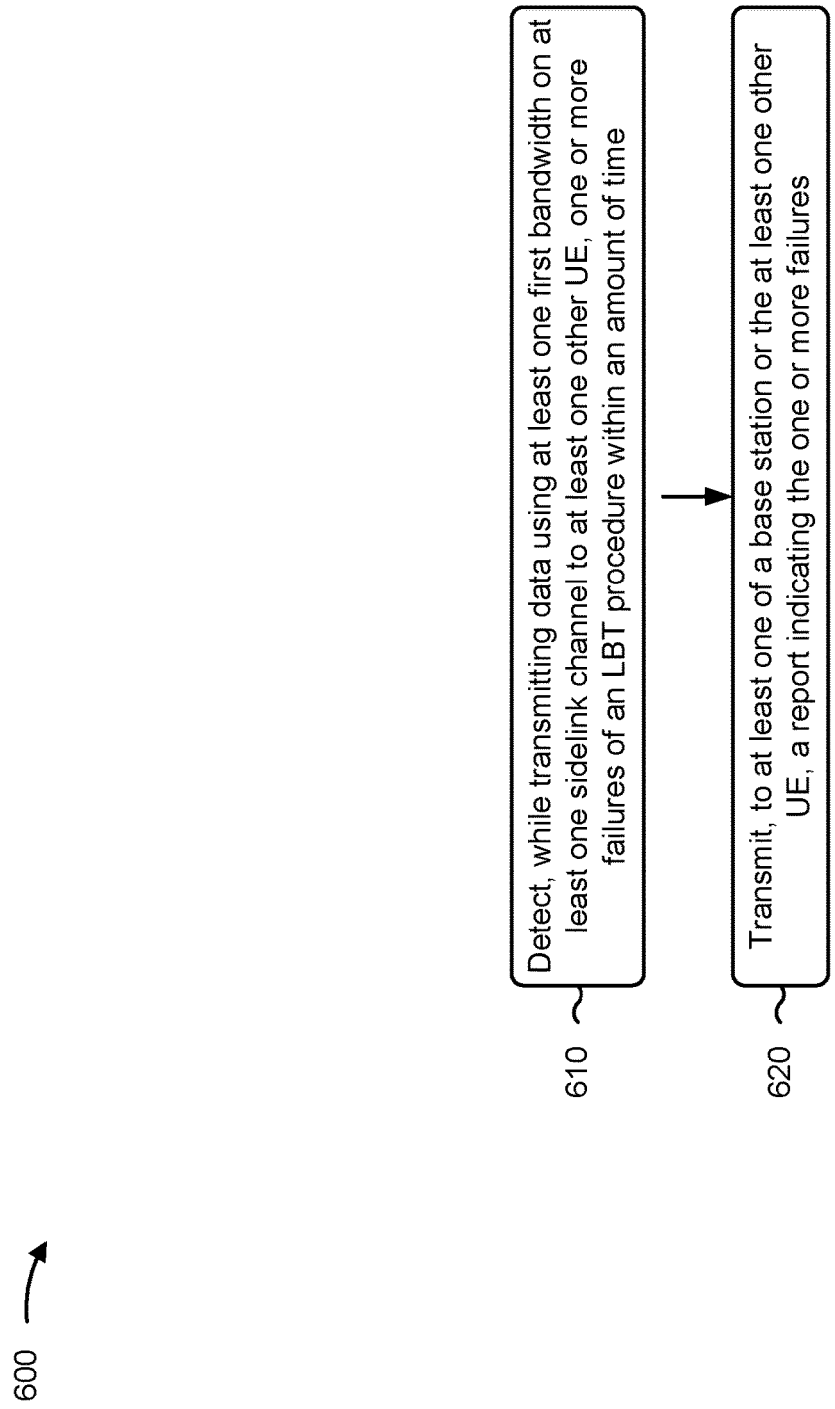
FIGS. 6-7 are diagrams illustrating example processes associated with LBT failure reporting for sidelink channels, in accordance with various aspects of the present disclosure.

FIG. 6 is a diagram illustrating an example process 600 performed, for example, by a UE, in accordance with various aspects of the present disclosure. Example process 600 is an example where the UE (e.g., apparatus 800 of FIG. 8, Tx UE 305-1, and/or UE 120) performs operations associated with LBT failure reporting for sidelink channels.

As shown in FIG. 6, in some aspects, process 600 may include detecting, while transmitting data using at least one first bandwidth on at least one sidelink channel to at least one other UE, one or more failures of an LBT procedure within an amount of time (block 610). For example, the UE (e.g., using detection component 808, depicted in FIG. 8) may detect the one or more failures of the LBT procedure within the amount of time, as described above.

As further shown in FIG. 6, in some aspects, process 600 may include transmitting, to at least one of a base station (e.g., apparatus 900 of FIG. 9 and/or base station 110) or the at least one other UE, a report indicating the one or more failures (block 620). For example, the UE (e.g., using transmission component 804, depicted in FIG. 8) may transmit the report indicating the one or more failures, as described above.

Process 600 may include additional aspects, such as any single aspect or any combination of aspects described below and/or in connection with one or more other processes described elsewhere herein.

In a first aspect, the at least one sidelink channel includes a base station controlled sidelink channel, and the report is transmitted to the base station.

In a second aspect, alone or in combination with the first aspect, process 600 further includes retransmitting the data (e.g., using transmission component 804), to the at least one other UE, using at least one second bandwidth on the at least one sidelink channel.

In a third aspect, alone or in combination with one or more of the first and second aspects, the at least one sidelink channel comprises a PSBCH, a PSCCH, a PSSCH, a PSFCH, or a combination thereof.

In a fourth aspect, alone or in combination with one or more of the first through third aspects, the one or more failures are associated with at least one unicast link to the at least one other UE, a groupcast link to the at least one other UE, or a combination thereof.

In a fifth aspect, alone or in combination with one or more of the first through fourth aspects, the amount of time is based at least in part on whether the one or more failures are associated with at least one unicast link or with a groupcast link.

In a sixth aspect, alone or in combination with one or more of the first through fifth aspects, the one or more failures are aggregated across an RB set, a BWP, or a plurality of sidelink channels.

In a seventh aspect, alone or in combination with one or more of the first through sixth aspects, the one or more failures are aggregated across a PC5 interface for the at least one sidelink channel and a Uu interface with the base station.

In an eighth aspect, alone or in combination with one or more of the first through seventh aspects, process 600 further includes receiving at least one configuration message (e.g., using reception component 802, depicted in FIG. 8) from the base station, and the amount of time is based at least in part on the at least one configuration message.

In a ninth aspect, alone or in combination with one or more of the first through eighth aspects, the amount of time is based at least in part on a value stored in the memory.

In a tenth aspect, alone or in combination with one or more of the first through ninth aspects, the one or more failures are associated with one carrier of a plurality of aggregated carriers.

In an eleventh aspect, alone or in combination with one or more of the first through tenth aspects, process 600 further includes canceling pending transmissions (e.g., using scheduling component 810, depicted in FIG. 8) based at least in part on detecting the one or more failures, and ceasing transmitting one or more broadcast signals (e.g., using transmission component 804) based at least in part on detecting the one or more failures.

In a twelfth aspect, alone or in combination with one or more of the first through eleventh aspects, the report is transmitted to the at least one other UE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
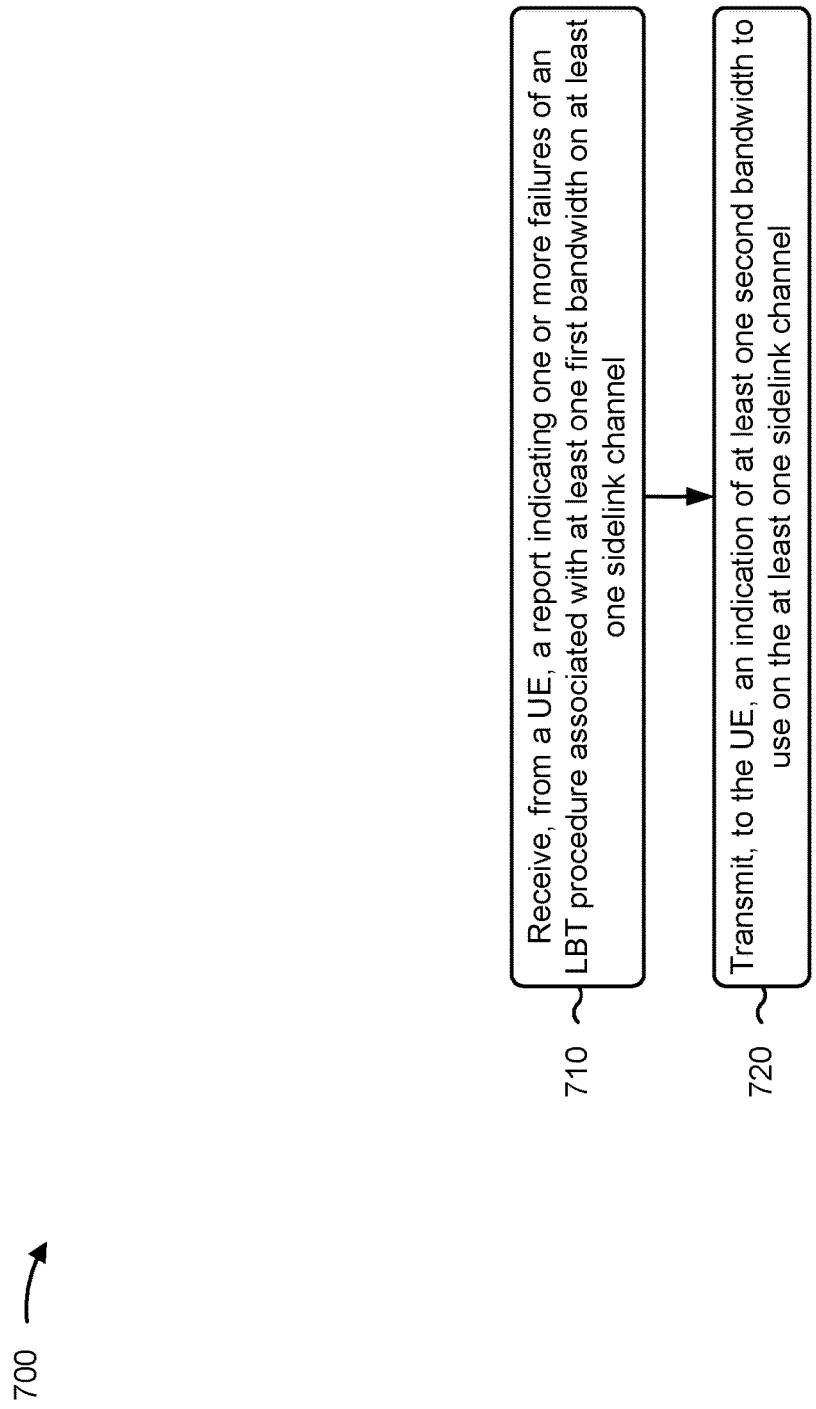

FIG. 7 is a diagram illustrating an example process 700 performed, for example, by a base station, in accordance with various aspects of the present disclosure. Example process 700 is an example where the base station (e.g., apparatus 900 of FIG. 9 and/or base station 110) performs operations associated with LBT failure reporting for sidelink channels.

As shown in FIG. 7, in some aspects, process 700 may include receiving, from a UE (e.g., apparatus 800 of FIG. 8, Tx UE 305-1, and/or UE 120), a report indicating one or more failures of an LBT procedure associated with at least one first bandwidth on at least one sidelink channel (block 710). For example, the base station (e.g., using reception component 902, depicted in FIG. 9) may receive the report indicating the one or more failures of the LBT procedure, as described above.

As further shown in FIG. 7, in some aspects, process 700 may include transmitting, to the UE, an indication of at least one second bandwidth to use on the at least one sidelink channel (block 720). For example, the base station (e.g., using transmission component 904, depicted in FIG. 9) may transmit the indication of the at least one second bandwidth to use, as described above.

Process 700 may include additional aspects, such as any single aspect or any combination of aspects described below and/or in connection with one or more other processes described elsewhere herein.

In a first aspect, the at least one sidelink channel comprises a PSBCH, a PSCCH, a PSSCH, a PSFCH, or a combination thereof.

In a second aspect, alone or in combination with the first aspect, the one or more failures are associated with at least one unicast link between the UE and at least one other UE, a groupcast link between the UE and at least one other UE, or a combination thereof.

In a third aspect, alone or in combination with one or more of the first and second aspects, the one or more failures are associated with an amount of time that is based at least in part on whether the one or more failures are associated with at least one unicast link or with a groupcast link.

In a fourth aspect, alone or in combination with one or more of the first through third aspects, the one or more failures are aggregated across an RB set, a BWP, or a plurality of sidelink channels.

In a fifth aspect, alone or in combination with one or more of the first through fourth aspects, the one or more failures are aggregated across a PC5 interface for the at least one sidelink channel and a Uu interface with the base station.

In a sixth aspect, alone or in combination with one or more of the first through fifth aspects, process 700 further includes transmitting at least one configuration message (e.g., using transmission component 904) to the UE, and the one or more failures are associated with an amount of time that is based at least in part on the at least one configuration message.

In a seventh aspect, alone or in combination with one or more of the first through sixth aspects, the one or more failures are associated with an amount of time that is based at least in part on a value stored in the memory.

In an eighth aspect, alone or in combination with one or more of the first through seventh aspects, the one or more failures are associated with one carrier of a plurality of aggregated carriers.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
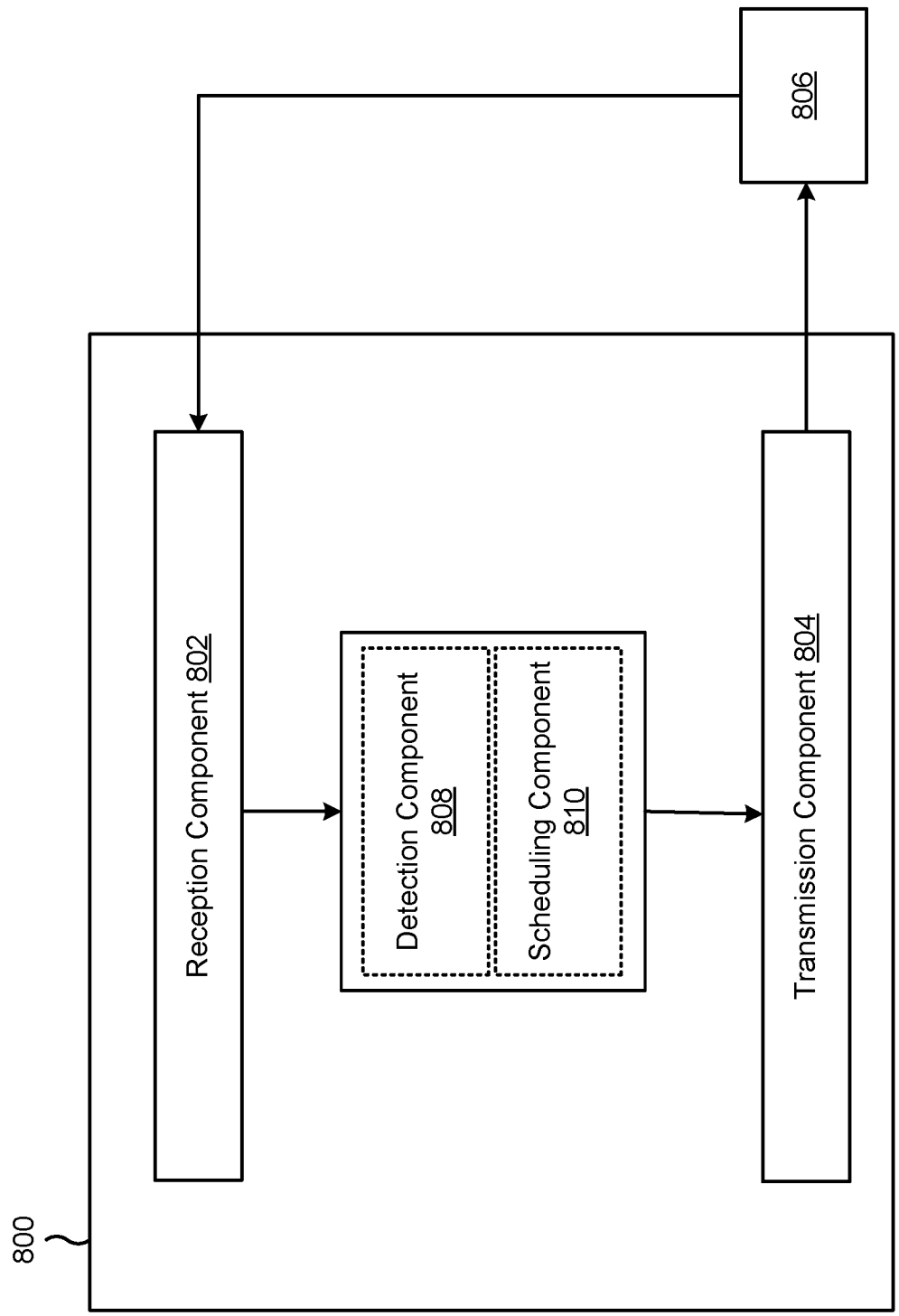
FIGS. 8-9 are block diagrams of example apparatuses for wireless communication, in accordance with various aspects of the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of a detection component 808 or a scheduling component 810, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

In some aspects, the detection component 808 may detect, while the transmission component 804 transmits data using at least one first bandwidth on at least one sidelink channel to at least one other UE, one or more failures of an LBT procedure within an amount of time. In some aspects, the detection component 808 may include one or more antennas, a demodulator, a MIMO detector, a receive processor, a controller/processor, a memory, or a combination thereof, of the UE described above in connection with FIG. 2. Accordingly, the transmission component 804 may transmit, to at least one of the apparatus 806 or the at least one other UE, a report indicating the one or more failures. In some aspects, the transmission component 804 may further retransmit the data, to the at least one other UE, using at least one second bandwidth on the at least one sidelink channel.

In some aspects, the reception component 802 may receive at least one configuration message from the apparatus 806, such that the amount of time is based at least in part on the at least one configuration message.

In some aspects, the scheduling component 810 may cancel pending transmissions based at least in part on the detection component 808 detecting the one or more failures. In some aspects, the scheduling component 810 may include one or more antennas, a modulator, a transmit MIMO processor, a transmit processor, a controller/processor, a memory, or a combination thereof, of the UE described above in connection with FIG. 2. Additionally, or alternatively the transmission component 804 may cease transmitting one or more broadcast signals based at least in part on the detection component 808 detecting the one or more failures.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
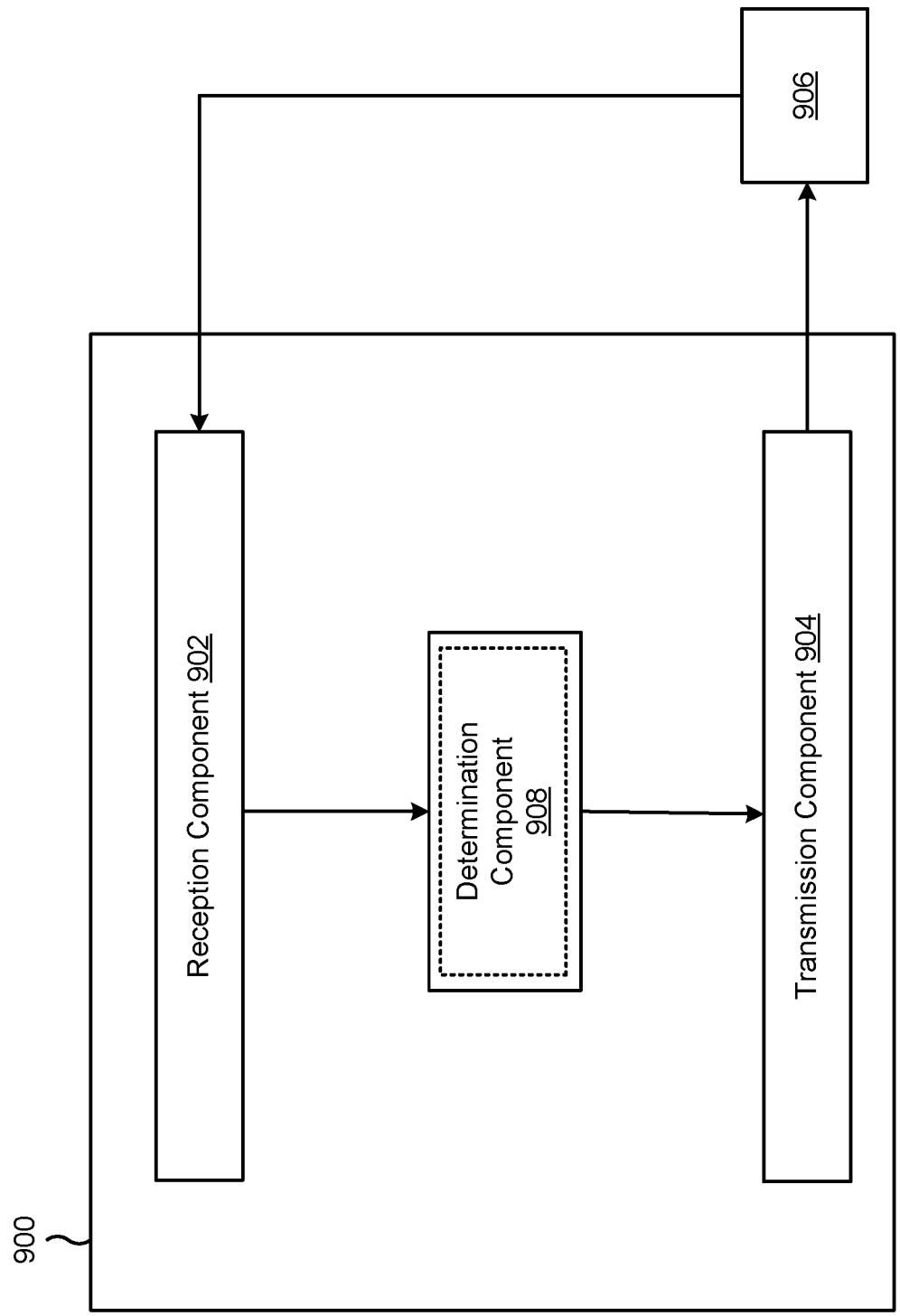

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a determination component 908, among other examples.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

In some aspects, the reception component 902 may receive, from the apparatus 906, a report indicating one or more failures of an LBT procedure associated with at least one first bandwidth on at least one sidelink channel. Accordingly, the transmission component 904 may transmit, to the apparatus 906, an indication of at least one second bandwidth to use on the at least one sidelink channel. For example, the determination component 908 may determine the at least one second bandwidth based at least in part on the report. In some aspects, the determination component 908 may include a receive processor, a transmit processor, a controller/processor, a memory, or a combination thereof, of the base station described above in connection with FIG. 2.

In some aspects, the transmission component 904 may transmit at least one configuration message to the apparatus 906, and one or more failures may be associated with an amount of time that is based at least in part on the at least one configuration message.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some aspects of the present disclosure:

Aspect 1: A method of wireless communication performed by a user equipment (UE), comprising: detecting, while transmitting data using at least one first bandwidth on at least one sidelink channel to at least one other UE, one or more failures of a listen-before-talk (LBT) procedure within an amount of time; and transmitting, to at least one of a base station or the at least one other UE, a report indicating the one or more failures.

Aspect 2: The method of aspect 1, wherein the at least one sidelink channel includes a base station controlled sidelink channel, and the report is transmitted to the base station.

Aspect 3: The method of any of aspects 1 through 2, further comprising: retransmitting the data, to the at least one other UE, using at least one second bandwidth on the at least one sidelink channel.

Aspect 4: The method of any of aspects 1 through 3, wherein the at least one sidelink channel comprises a physical sidelink broadcast channel (PSBCH), a physical sidelink control channel (PSCCH), a physical sidelink shared channel (PSSCH), a physical sidelink feedback channel (PSFCH), or a combination thereof.

Aspect 5: The method of any of aspects 1 through 4, wherein the one or more failures are associated with at least one unicast link to the at least one other UE, a groupcast link to the at least one other UE, or a combination thereof.

Aspect 6: The method of any of aspects 1 through 5, wherein the amount of time is based at least in part on whether the one or more failures are associated with at least one unicast link or with a groupcast link.

Aspect 7: The method of any of aspects 1 through 6, wherein the one or more failures are aggregated across a resource block (RB) set, a bandwidth part (BWP), or a plurality of sidelink channels.

Aspect 8: The method of any of aspects 1 through 7, wherein the one or more failures are aggregated across a PC5 interface for the at least one sidelink channel and a Uu interface with the base station.

Aspect 9: The method of any of aspects 1 through 8, further comprising: receiving at least one configuration message from the base station, wherein the amount of time is based at least in part on the at least one configuration message.

Aspect 10: The method of any of aspects 1 through 9, wherein the amount of time is based at least in part on a value stored in the memory.

Aspect 11: The method of any of aspects 1 through 10, wherein the one or more failures are associated with one carrier of a plurality of aggregated carriers.

Aspect 12: The method of any of aspects 1 through 11, further comprising: canceling pending transmissions based at least in part on detecting the one or more failures; and ceasing transmitting one or more broadcast signals based at least in part on detecting the one or more failures.

Aspect 13: The method of any of aspects 1 through 12, wherein the report is transmitted to the at least one other UE.

Aspect 14: A method of wireless communication performed by a base station, comprising: receiving, from a UE, a report indicating one or more failures of an LBT procedure associated with at least one first bandwidth on at least one sidelink channel; and transmitting, to the UE, an indication of at least one second bandwidth to use on the at least one sidelink channel.

Aspect 15: The method of aspect 14, wherein the at least one sidelink channel comprises a PSBCH, a PSCCH, a PSSCH, a PSFCH, or a combination thereof.

Aspect 16: The method of any of aspects 14 through 15, wherein the one or more failures are associated with at least one unicast link between the UE and at least one other UE, a groupcast link between the UE and at least one other UE, or a combination thereof.

Aspect 17: The method of any of aspects 14 through 16, wherein the one or more failures are associated with an amount of time that is based at least in part on whether the one or more failures are associated with at least one unicast link or with a groupcast link.

Aspect 18: The method of any of aspects 14 through 17, wherein the one or more failures are aggregated across an RB set, a BWP, or a plurality of sidelink channels.

Aspect 19: The method of any of aspects 14 through 18, wherein the one or more failures are aggregated across a PC5 interface for the at least one sidelink channel and a Uu interface with the base station.

Aspect 20: The method of any of aspects 14 through 19, further comprising: transmitting at least one configuration message to the UE, wherein the one or more failures are associated with an amount of time that is based at least in part on the at least one configuration message.

Aspect 21: The method of any of aspects 14 through 20, wherein the one or more failures are associated with an amount of time that is based at least in part on a value stored in the memory.

Aspect 22: The method of any of aspects 14 through 21, wherein the one or more failures are associated with one carrier of a plurality of aggregated carriers.

Aspect 23: An apparatus for wireless communication at a device, comprising a processor; memory coupled with the processor; and instructions stored in the memory and executable by the processor to cause the apparatus to perform the method of one or more aspects of aspects 1-13.

Aspect 24: A device for wireless communication, comprising a memory and one or more processors coupled to the memory, the memory and the one or more processors configured to perform the method of one or more aspects of aspects 1-13.

Aspect 25: An apparatus for wireless communication, comprising at least one means for performing the method of one or more aspects of aspects 1-13.

Aspect 26: A non-transitory computer-readable medium storing code for wireless communication, the code comprising instructions executable by a processor to perform the method of one or more aspects of aspects 1-13.

Aspect 27: A non-transitory computer-readable medium storing a set of instructions for wireless communication, the set of instructions comprising one or more instructions that, when executed by one or more processors of a device, cause the device to perform the method of one or more aspects of aspects 1-13.

Aspect 28: An apparatus for wireless communication at a device, comprising a processor; memory coupled with the processor; and instructions stored in the memory and executable by the processor to cause the apparatus to perform the method of one or more aspects of aspects 14-22.

Aspect 29: A device for wireless communication, comprising a memory and one or more processors coupled to the memory, the memory and the one or more processors configured to perform the method of one or more aspects of aspects 14-22.

Aspect 30: An apparatus for wireless communication, comprising at least one means for performing the method of one or more aspects of aspects 14-22.

Aspect 31: A non-transitory computer-readable medium storing code for wireless communication, the code comprising instructions executable by a processor to perform the method of one or more aspects of aspects 14-22.

Aspect 32: A non-transitory computer-readable medium storing a set of instructions for wireless communication, the set of instructions comprising one or more instructions that, when executed by one or more processors of a device, cause the device to perform the method of one or more aspects of aspects 14-22.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors coupled to the memory, the one or more processors configured to:
      transmit data, to at least one other UE, using at least one first bandwidth on a first sidelink channel;
      detect, while transmitting the data, one or more failures of a listen-before-talk (LBT) procedure within an amount of time; and
      transmit, to the at least one other UE and on a second sidelink channel, a report indicating the one or more failures.

2. The UE of claim 1, wherein the one or more processors are further configured to:
   retransmit the data, to the at least one other UE, using at least one second bandwidth on the first sidelink channel.

3. The UE of claim 1, wherein the first sidelink channel comprises a physical sidelink broadcast channel (PSBCH), a physical sidelink control channel (PSCCH), a physical sidelink shared channel (PSSCH), a physical sidelink feedback channel (PSFCH), or a combination thereof.

4. The UE of claim 1, wherein the one or more failures are associated with at least one unicast link to the at least one other UE, a groupcast link to the at least one other UE, or a combination thereof.

5. The UE of claim 1, wherein the one or more processors are further configured to:
   retransmit the data, to the at least one other UE, according to mode 2 PC5.

6. The UE of claim 1, wherein the one or more failures are aggregated across a resource block (RB) set, a bandwidth part (BWP), or a plurality of sidelink channels.

7. The UE of claim 1, wherein the one or more failures are aggregated across a PC5 interface for the first sidelink channel and a Uu interface with a network node.

8. The UE of claim 1, wherein the one or more processors are further configured to:
   receive at least one configuration message from a network node, wherein the amount of time is based at least in part on the at least one configuration message.

9. The UE of claim 1, wherein the amount of time is based at least in part on a value stored in the memory.

10. The UE of claim 1, wherein the one or more failures are associated with one carrier of a plurality of aggregated carriers.

11. The UE of claim 1, wherein the one or more processors are further configured to:
   cancel pending transmissions based at least in part on detecting the one or more failures; and
   cease transmitting one or more broadcast signals based at least in part on detecting the one or more failures.

12. A network node for wireless communication, comprising:
  a memory; and
  one or more processors coupled to the memory, the one or more processors configured to:
    transmit, to a first user equipment (UE), one or more configuration messages that indicate at least one first bandwidth to use when transmitting data to a second UE;
    receive a report indicating one or more failures of a listen-before-talk (LBT) procedure associated with the at least one first bandwidth on at least one sidelink channel; and
    transmit, to the first UE, an updated configuration for the at least one sidelink channel, the updated configuration indicating at least one second bandwidth to use on the at least one sidelink channel.

13. The network node of claim 12, wherein the at least one sidelink channel comprises a physical sidelink broadcast channel (PSBCH), a physical sidelink control channel (PSCCH), a physical sidelink shared channel (PSSCH), a physical sidelink feedback channel (PSFCH), or a combination thereof.

14. The network node of claim 12, wherein the one or more failures are associated with at least one unicast link between the UE and at least one other UE, a groupcast link between the UE and at least one other UE, or a combination thereof.

15. The network node of claim 12, wherein the one or more failures are associated with an amount of time that is based at least in part on whether the one or more failures are associated with at least one unicast link or with a groupcast link.

16. The network node of claim 12, wherein the one or more failures are aggregated across a resource block (RB) set, a bandwidth part (BWP), or a plurality of sidelink channels.

17. The network node of claim 12, wherein the one or more failures are aggregated across a PC5 interface for the at least one sidelink channel and a Uu interface with the network node.

18. The network node of claim 12, wherein the one or more LBT failures are aggregated across a plurality of unicast links, a plurality of groupcast links, or at least one unicast link and at least one groupcast link.

19. A method of wireless communication performed by a user equipment (UE), comprising:
  transmitting data, to at least one other UE, using at least one first bandwidth on a first sidelink channel;
  detecting, while transmitting the data, one or more failures of a listen-before-talk (LBT) procedure within an amount of time; and
  transmitting, to the at least one other UE and on a second sidelink channel, a report indicating the one or more failures.

20. The method of claim 19, wherein the second sidelink channel comprises a sidelink channel between the at least one UE and a relay UE.

* * * * *